UNITED STATES PATENT OFFICE.

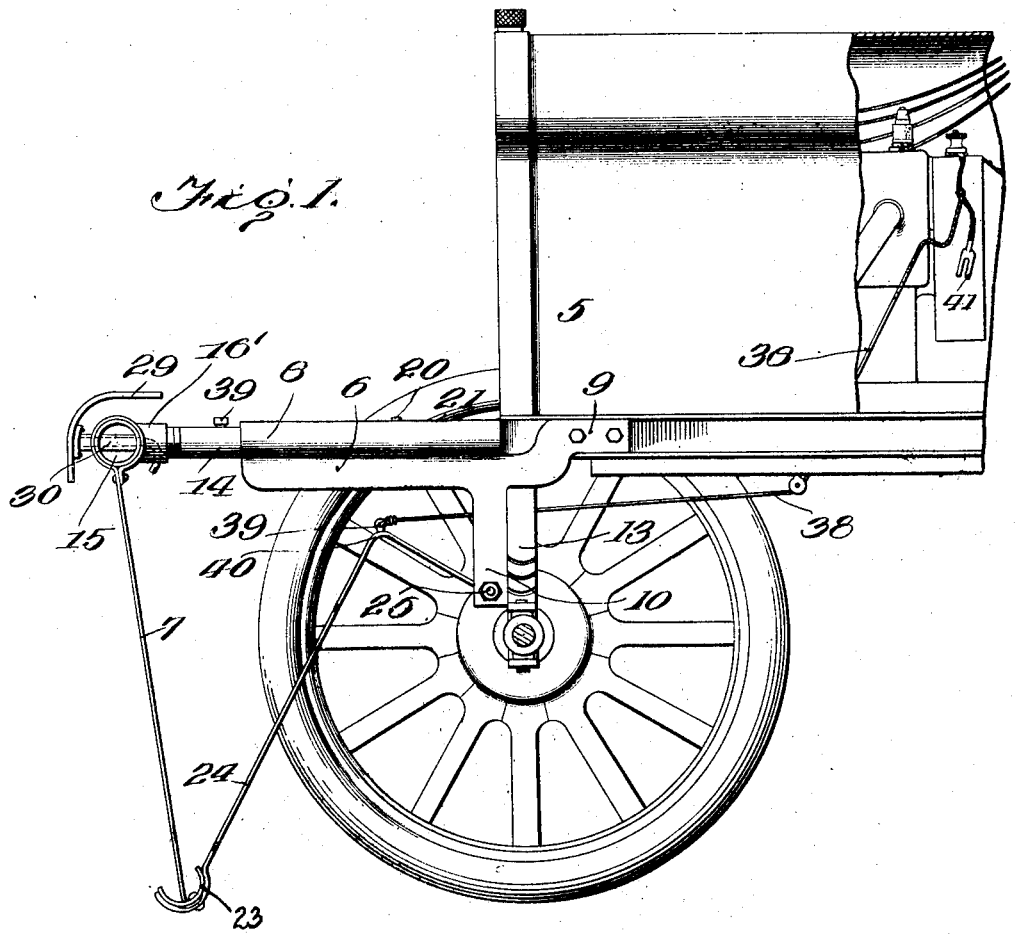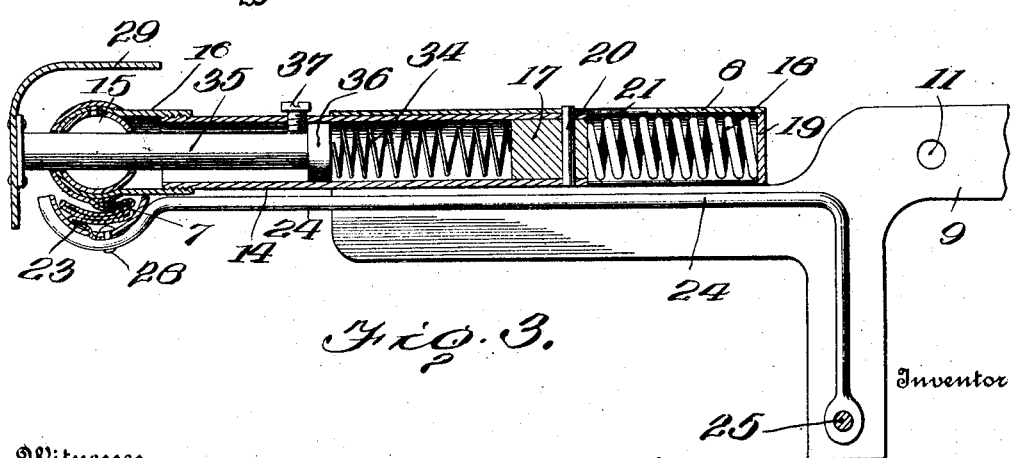

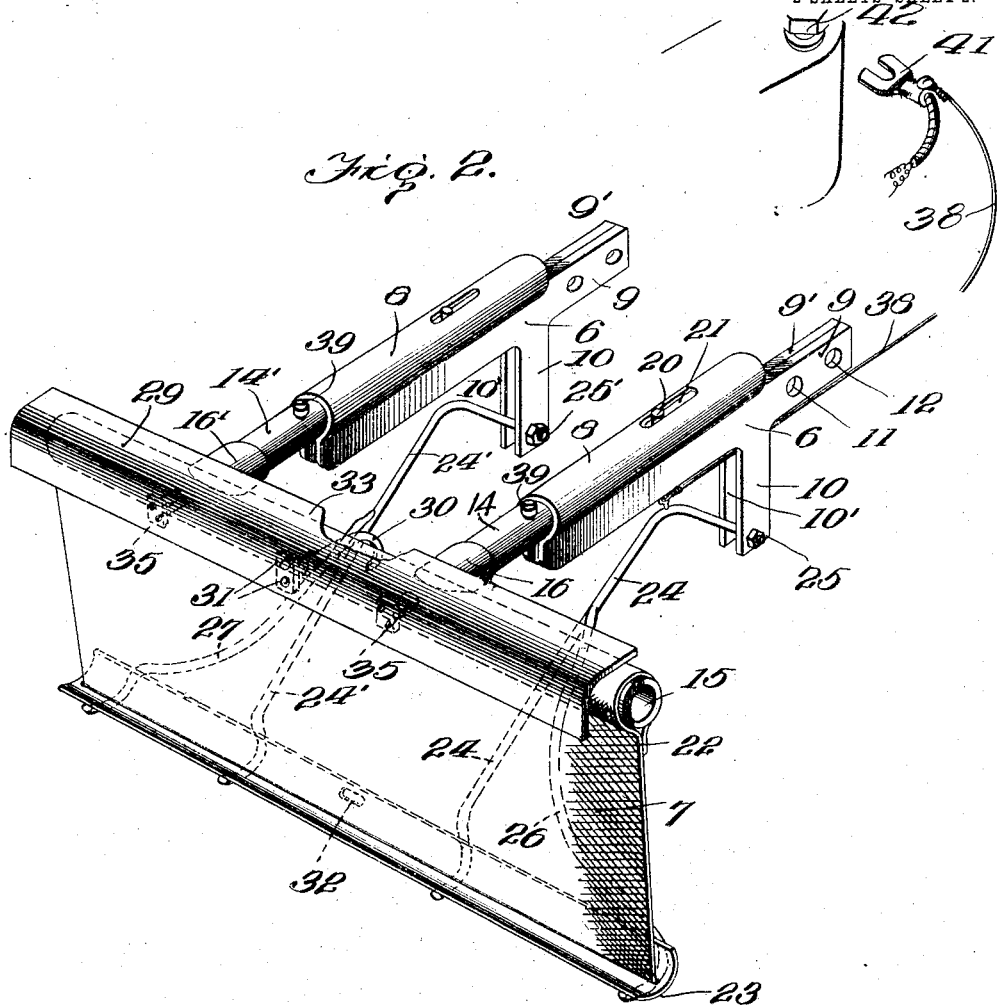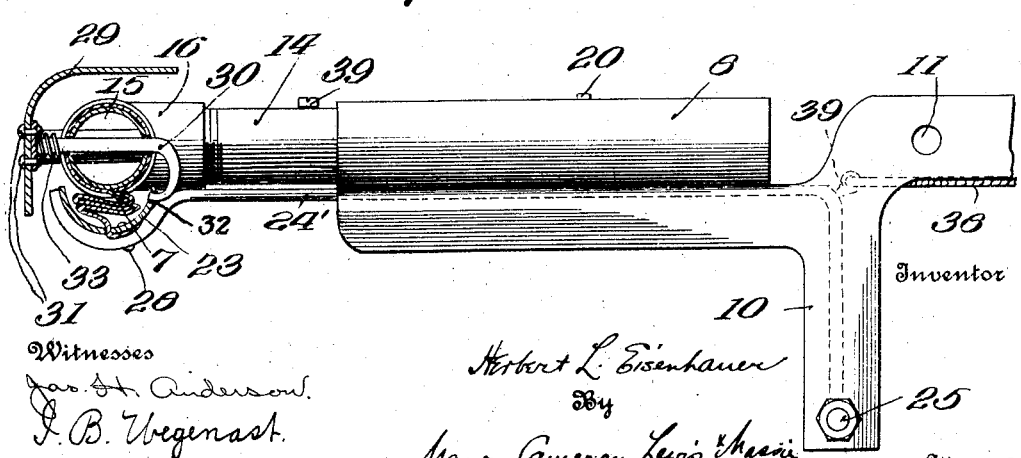

HERBERT L. EISENHAUER, OF EUCLID, OHIO.

SAFETY DEVICE FOR VEHICLES.

1,111,888. Specification of Letters Patent. Patented Sept. 29, 1914.

Application filed April 20, 1914. Serial No. 833,239.

*To all whom it may concern:*

Be it known that I, HERBERT L. EISENHAUER, a citizen of the United States of America, and resident of Euclid, Ohio, have invented a new and useful Improvement in Safety Devices for Vehicles, which invention is fully set forth in the following specification.

The present invention relates to safety devices for vehicles, and particularly to automobiles, and the objects of the invention are to provide a simple, compact and inconspicuous device of the character described that may be readily placed on and removed from vehicles; that will automatically stop the vehicle in the event of a collision, minimize the danger of injury to the person or other object that may be struck, and also minimize the danger of injury to the machine due to the collision.

Generally stated, these objects are attained by providing a movable contact chamber, preferably in the form of a yielding fender, with which is associated a shield that is automatically dropped in front of the vehicle wheels upon the initial movement of the fender when it strikes the object. Further or continued movement of said contact member or fender brings into operation a buffer element or elements to protect the machine from the shock of collision. In addition, a connection is provided between the movable shield mechanism and the engine, whereby when the shield drops in front of the wheels, the engine is automatically stopped, as by opening the circuit to the spark coil.

The invention will be better understood by reference to the accompanying drawings, wherein:—

Figure 1 is a side elevation of the front part of a vehicle (with one of the wheels removed) showing the improved device in position on the machine and the shield in its dropped position; Fig. 2 is a perspective view of the improved device; Fig. 3 is a longitudinal sectional view through one of the sockets showing the canvas shield folded; and Fig. 4 is a sectional view, partly in elevation, showing the means for holding the shield in its folded position.

Referring to the drawings, wherein like reference numerals indicate like parts, 5 indicates the front of a vehicle, such as an automobile, to each side of which is secured a member 6, which members support a framework for a suitable shield 7, preferably of canvas, which shield is adapted to be automatically dropped in front of the wheels of the vehicle. The members 6 are identical and each is preferably of sheet metal stamped up into the form shown in Fig. 2, with a socket 8, side pieces 9 and 9', and projections 10 and 10'. These supporting members 6 are secured to the machine in any suitable manner, as by bolts or screws passing through openings 11 and 12, and the projections 10 and 10' bearing against the front vehicle springs 13 (Fig. 1) when the device is in position on the vehicle.

Engaging in sockets 8 are two reciprocating members, here shown as plungers 14 and 14', the outer ends of which are secured to a transverse member 15 by T-joints 16 and 16'. As here shown, the plungers 14 and 14' are hollow, and the inner end of each is closed by a plug or block 17 against which bears one end of a heavy coiled buffer spring 18, the other end of which engages a closure 19 in the end of socket 8. A pin 20 is carried by the end of each plunger and engages in a slot 21 in the socket.

The upper edge of the shield 7 is secured to the transverse member or bar 15 in any suitable manner, preferably the canvas passing entirely around the same and being stitched at 22. The lower edge of the shield 7 is secured in any desired manner to a bar or curved plate 23, which plate preferably engages the ground when the shield is dropped. Said plate is supported when the shield is folded (Fig. 3) and braced when the shield is dropped (Fig. 2) by arms 24 and 24', pivoted at 25 and 25', between the projections 10 and 10'. Arm 24 is preferably provided with a branch 26 and arm 24' with a branch 27, so that the curved plate 23 is engaged at four points by said arms which, preferably, pass entirely under said plate 23 and are secured thereto in any suitable manner, as by rivets 28 which also pass through the canvas of shield 7 (Figs. 3 and 4).

The shield is held in the folded position, shown in Figs. 3 and 4, by means connected to a movable contact member 29, here shown in the form of a fender. This contact member or fender 29 is preferably curved to project over and conceal the bar 15, thus rendering the device very inconspicuous when the shield is folded and protecting the shield and other parts from the elements. The preferred form of means for holding the shield folded is a latching member 30, one end of which is riveted or otherwise suitably secured to the fender at 31, and the other end of which is curved to engage in an opening 32 (Fig. 2) in plate 23. This latching member 30 preferably projects through an opening in the hollow bar 15 and preferably a small coiled spring 33 surrounds said latching member, said spring abutting at one end against bar 15 and at its other end against fender 29, the tendency of said spring being to hold the parts in the position shown in Fig. 4.

In view of the fact that the disengagement of latch 30 from opening 32 not only results in the dropping of the shield but also acts to automatically stop the motor, it is important to prevent accidental or inadvertent unlatching, and hence additional spring members are provided to hold the parts in the position shown in Figs. 3 and 4 until the fender 29 strikes a person or other object. As here shown, these springs 34 are carried in plungers 14 and 14'—one in each. Each of these springs is associated with a rod 35 (Fig. 3), one end of which is riveted or otherwise secured to the contact member or fender 29, and the other end of which carries a piston 36 against which bears one end of spring 34, the other end of which bears against the plug or block 17. A set-screw 37 is carried by each of the plungers 14 and 14' and projects into the path of pistons 36 to limit the movement of the same, and of fender 29, toward the left.

It is highly desirable that the machine should be stopped as soon as possible after the dropping of shield 7, and with this object in view, one end of a connecting wire or rope 38 is secured to the shield 7 or a movable part associated therewith, the other end of said wire or rope connecting to the spark coil, the clutch or other desired part, so that, when the shield drops, the spark coil or clutch will be opened and the car ceases to be driven. As here shown, one end of the wire 38 is secured to an eyelet 39 provided on an elbow 40 of arm 24, and the other end is connected to a terminal 41 which is adapted for electrical connection with spark coil 42. Terminal 41 and spark coil 42 are shown in Fig. 2, the terminal being shown detached from the spark coil.

The operation of the device is as follows: During the normal running of the vehicle, the parts are in the position shown in Figs. 3 and 4, with the shield 7 folded and the latch 30 engaging in opening 32, the parts being held in this position by springs 33 and 34. If now, the movable contact member or fender 29 strikes a person or other object, it will be forced back toward the machine against the tension of springs 33 and 34, latch 30 will be removed from opening 32, and the shield 7 will drop; plate 23 preferably resting on the ground and being braced in that position by arms 24 and 24'. As the shield drops, the arm 24 moves around its pivot 25, thus pulling on cord or wire 38 and removing terminal 41 from the spark coil 42. If the person or object is struck with sufficient force, the contact member or fender 29 will be driven against bar 15, and will force rearwardly said bar and plungers 14 and 14' connected thereto against the tension of buffer springs 18, whereby injury to the machine will be prevented.

While, for the purpose of illustration, one expression of the inventive idea is herein shown and described in great detail, it is to be understood that this disclosure is merely for the purpose of illustration and that the inventive idea is susceptible of various mechanical expressions within the limits of the appended claims.

What is claimed is:—

1. In a device of the character described, the combination of a movable contact member, a plurality of spring-pressed rods connected thereto, reciprocating members in which said rods project and in relation to which they move, buffer springs bearing against said reciprocating members, a shield, and means operated on the movement of said contact member to release said shield and permit it to drop in front of the vehicle wheels.

2. In a device of the character described, the combination of a movable contact member, a plurality of spring-pressed rods connected thereto, reciprocating members in which said rods project and in relation to which they move, buffer springs bearing against said reciprocating members, a shield, and means connected to said contact member and operating when the same is moved to release said shield.

3. In a device of the character described, the combination of a movable contact member, a plurality of spring-pressed rods connected thereto, reciprocating members in which said rods project and in relation to which they move, buffer springs bearing against said reciprocating members, a shield, means operated on the movement of said contact member to release said shield and permit it to drop in front of the vehicle wheels, motor mechanism, and connections between said shield and the motor mechanism for stopping the motor when the shield is dropped.

4. In a device of the character described, the combination of a collapsible shield, a movable contact member, connections between said shield and member whereby the former is maintained in collapsed position, a plurality of springs adapted to maintain the shield in collapsed condition, a plurality of plungers independent of said contact member but adapted to be moved rearward upon the movement of said contact member, and buffer springs associated with said plungers.

5. In a device of the character described, the combination of a collapsible shield, means maintaining said shield in collapsed condition, a spring-pressed movable contact member the initial movement of which displaces said means and permits said shield to drop, a plunger independent of said contact member but adapted to be moved rearward upon the further movement of said contact member, and a buffer spring associated with said plunger.

6. In a device of the character described, the combination of a collapsible shield, means engaging and holding said shield in collapsed condition, a movable contact member the initial movement of which displaces said means and permits said shield to drop, a reciprocating member independent of said contact member but adapted to be moved rearward upon the further movement of said contact member, and a buffer spring associated with said reciprocating member.

7. In a device of the character described, the combination of a shield, a latch adapted to engage said shield, a spring acting to hold said latch in engagement with said shield, a reciprocating member, a buffer spring acting on the same, and a movable contact member independent of said reciprocating member the initial movement of which displaces the latch against the tension of its spring and permits said shield to fall and the further movement of which displaces the reciprocating member against the tension of its spring.

8. In a device of the character described, the combination of a shield, a latch adapted to engage said shield, a spring acting to hold said latch in engagement with said shield, a reciprocating member, a buffer spring acting on the same, a movable contact member independent of said reciprocating member the initial movement of which contact member displaces the latch against the tension of its spring and permits said shield to fall and the further movement of which displaces the reciprocating member against the tension of its spring, motor mechanism, and connections between said shield and mechanism.

9. In a device of the character described, the combination of a movable contact member, a plurality of spring-pressed rods connected thereto, a plurality of reciprocating members in which said rods project, buffer springs bearing against one end of said reciprocating members, a bar connected to the other end of each of said reciprocating members and adapted to be engaged by said contact member, a collapsible shield connected along one edge to said bar, a plate to which the opposite edge of said shield is connected, and a latch carried by said contact member and engaging said plate to hold said shield in its collapsed condition.

10. In a device of the character described, the combination of a movable contact member, a spring-pressed rod connected thereto, a reciprocating member in which said rod projects, a buffer spring bearing against one end of said reciprocating member, a bar connected to the other end of said reciprocating member and adapted to be engaged by said contact member, a collapsible shield connected along one edge to said bar, a plate to which the opposite edge of said shield is connected, and a latch carried by said contact member and engaging said plate to hold said shield in its collapsed condition.

11. In a device of the character described, the combination of a movable contact member, a plurality of spring-pressed rods connected thereto, a plurality of reciprocating members in which said rods project, buffer springs bearing against one end of said reciprocating members, a bar connected to the other end of each of said reciprocating members and adapted to be engaged by said contact member, a collapsible shield connected along one edge to said bar, a plate to which the opposite edge of said shield is connected, a latch carried by said contact member and engaging said plate to hold said shield in its collapsed condition, and pivoted arms supporting said plate when the shield is collapsed and bracing the same when the shield is dropped.

12. In a device of the character described, the combination of a movable contact member, a spring-pressed rod connected thereto, a reciprocating member in which said rod projects, a buffer spring bearing against one end of said reciprocating member, a bar connected to the other end of said reciprocating member and adapted to be engaged by said contact member, a collapsible shield connected along one edge to said bar, a plate to which the opposite edge of said shield is connected, a latch carried by said contact member and engaging said plate to hold said shield in its collapsed condition, and a pivoted arm supporting said plate when the shield is collapsed and bracing the same when the shield is dropped.

13. In a device of the character described, the combination of a movable spring-pressed contact member, a reciprocating member independent of but adapted to be moved rearward by said contact member, a buffer spring acting against said reciprocating member, a shield, and means operated on the movement of said contact member to release said shield and permit it to drop in front of the vehicle wheels.

14. In a device of the character described, the combination of a movable spring-pressed contact member, a reciprocating member independent of said contact member but adapted to be engaged and moved thereby, a buffer spring acting on said reciprocating member, a shield, and means operated on the movement of said contact member to release said shield and permit it to drop in front of the vehicle wheels.

15. In a device of the character described, the combination of a shield, a latch adapted to engage said shield, a reciprocating member, a buffer spring acting on the same, a movable contact member independent of said reciprocating member the initial movement of which contact member displaces the latch and the further movement of which displaces the reciprocating member against the tension of its spring.

16. In a device of the character described, the combination of a movable contact member, a plurality of spring-pressed rods connected thereto, a plurality of reciprocating members in which said rods project, buffer springs bearing against one end of said reciprocating members, a bar connected to the other end of each of said reciprocating members and adapted to be engaged by said contact member, a shield connected along one edge to said bar, and means operated on the movement of said contact member to release said shield and permit it to drop in front of the vehicle wheels.

17. In a device of the character described, the combination of a movable contact member, a spring-pressed rod connected thereto, a reciprocating member in which said rod projects, a buffer spring bearing against one end of said reciprocating member, a bar connected to the other end of said reciprocating member and adapted to be engaged by said contact member, a shield connected along one edge to said bar, and means operated on the movement of said contact member to release said shield and permit it to drop in front of the vehicle wheels.

In testimony whereof I have signed this specification in the presence of two subscribing witnesses.

HERBERT L. EISENHAUER.

Witnesses:
A. SHARP,
C. O. HARMON.

---

Copies of this patent may be obtained for five cents each, by addressing the "Commissioner of Patents, Washington, D. C."